United States Patent

Yamada et al.

Patent Number: 5,835,249
Date of Patent: Nov. 10, 1998

[54] APPARATUS AND METHOD FOR EXPOSING A LIQUID CRYSTAL PANEL BY BEAM SCANNING

[75] Inventors: Fumiaki Yamada, Yokohama; Yoichi Taira, Tokyo-to, both of Japan

[73] Assignee: International Business Machines Corporation, Armonk, N.Y.

[21] Appl. No.: 597,744

[22] Filed: Feb. 7, 1996

[30] Foreign Application Priority Data

Mar. 3, 1995 [JP] Japan ................................. 7-044252

[51] Int. Cl.⁶ ................................................. G02B 26/08
[52] U.S. Cl. ..................... 359/201; 359/202; 359/212; 359/214
[58] Field of Search .................... 359/201–202, 359/204, 212–216, 900; 250/234–236; 347/225, 256–261; 348/203; 345/50; 399/177, 200, 208, 216; 346/107.3, 107.4; 349/2, 4

[56] References Cited

U.S. PATENT DOCUMENTS

| | | | |
|---|---|---|---|
| 4,070,089 | 1/1978 | Grafton | 359/202 |
| 4,307,930 | 12/1981 | Saito | 359/201 |
| 5,309,273 | 5/1994 | Mori et al. | 359/202 |

Primary Examiner—James Phan
Attorney, Agent, or Firm—H. Daniel Schnurmann

[57] ABSTRACT

An energy application apparatus and a method to operate at high speed that makes high usage of light. An exposure apparatus includes a laser oscillator, an optical shutter, imaging lenses, a screen, a vertical deflecting device, a horizontal deflecting device, a vertical moving device, a liquid crystal panel, and a controller. A light beam emitted from the laser oscillator passes through the optical shutter when in its open position, and is directed by the imaging lens onto the slit or pattern on the screen. After passing through the slit, the light is gradually made to converge by the imaging lens and to enter the galvanomirror. The galvanomirror deflects the beam by a predetermined angle in the vertical direction, and the deflected beam enters the galvanomirror. The galvanomirror deflects the beam by a predetermined angle in the horizontal direction. Thereafter, the beam exposes a desired location of the liquid crystal panel located on the stage to form an image thereon.

21 Claims, 3 Drawing Sheets

APPARATUS AND METHOD FOR EXPOSING A LIQUID CRYSTAL PANEL BY BEAM SCANNING

FIELD OF THE INVENTION

The present invention relates to an apparatus and method for applying energy to an object located on a plane, and more particularly, to an apparatus and method for exposing a liquid crystal panel by beam scanning.

BACKGROUND OF THE INVENTION

Several methods have been successfully used for controlling the orientation of liquid crystal to balance the direction of liquid crystal molecules and to extend its viewing angle characteristics. Obtaining a wider viewing angle is particularly important to a liquid crystal panel with a thin film transistor. To control the orientation of a liquid crystal, a selected portion of an organic polymer, such as polyimide, is coated on the liquid crystal cell that corresponds to a single pixel. It is then selectively exposed by a deep ultraviolet laser, having a wavelength in the range of 200 to 300 nm.

To selectively expose a predetermined portion of a liquid crystal cell, it is necessary that the exposure be patterned. By way of example, in a 10-inch VGA color display, an exposure range of about 200 mm×150 mm that includes a set of 480×640 (×three colors) rectangular liquid crystal cells, a portion of each liquid crystal cell, e.g., a range about 100 to 150 $\mu$m in height along the upper and lower boundaries, must be selectively exposed.

Methods for applying a desired intensity of light at a selected location of such an object on a plane include:

(1) exposure methods that use a mask, such as direct exposure and projection exposure; and (2) beam exposure methods that use a raster or a vector scan device.

The exposure method that uses a mask as in (1) is known to suffer from the following limitations:

(a) it is difficult to irradiate the overall object with light of uniform intensity;

(b) for projection exposure, aberrations must be minimized over the entire object, which necessitates an advanced optical system;

(c) if a high coherent light source, such as a deep ultraviolet laser is used, interference fringes are likely to occur, thereby preventing a uniform exposure;

(d) since light on the portion that is not exposed is blocked by a mask, the usage of light is low if the ratio of the transmissive portion of the pattern to be drawn is small.

In the beam exposure method in (2), a deflecting device routinely includes a polygon mirror or a galvanomirror. When scanning with a polygon mirror, a beam deflected by the mirror moves in a predetermined direction at a specific angular velocity. An f$\Theta$ lens commonly used in laser beam printers is focused on the object to maintain the scanning velocity of the spot on the object over a wide range of the deflection angle $\Theta$ from its center. This method suffers from the following drawbacks:

(e) if a wide range is exposed as in a liquid panel, a large lens is required.

(f) The optical materials available for use in obtaining a transmission factor that is required for light of short wavelength, such as deep ultraviolet rays, are limited to synthetic liquid crystal and fluorite. These materials are expensive and difficult to process; furthermore they cannot be formed as aspheric lenses. It is thus difficult to design a combination of lenses for minimizing aberration.

(g) If an optical material other than the above described materials is used, e.g., glass, the necessary transmission factor cannot be obtained.

(h) It is likewise difficult to obtain a high optical output, since the use of light over a substantial application time must be increased in addition to the transmission factor.

When scanning with a galvanomirror, a deflecting device can be placed between the lens and the object, since the angular velocity of the mirror can be controlled. This allows to regulate the angular velocity of the mirror to maintain constant the velocity of the spot on the object, without having to resort to f$\Theta$ lens. If the position of the focal point must vary between the middle and the periphery of the object, an actuator for moving the lens on its optical axis to adjust its focal point can be installed to solve the problem. If, on the other hand, raster scan is used, the following problems occur:

(i) Saw-tooth waves are used as drive currents for controlling the horizontal deflection. Only the outgoing route for spot movement is used for exposure, while the incoming route, i.e., the retrace line, is not used to move the spot as rapidly as possible.

(j) Since light is blocked when using an optical shutter while the portion that does not require exposing is being scanned, the use of light is limited.

(k) If a wide range is exposed, the difference between the distance between a light source and the center of the object and the distance between the source and the periphery of the object may cause pincushion aberration, wherein the horizontal track of the spot is not a straight line but a curve bending toward the center.

OBJECTS OF THE INVENTION

Accordingly, it is an object of the invention to provide an apparatus and a method for exposing at high speed a liquid panel by beam scanning operating and making full usage of light.

It is another object of this invention to provide an apparatus and a method for exposing a liquid panel by beam scanning that can be used interchangeably with various types of light sources.

It is yet another object of this invention to provide an apparatus and method for exposing a liquid panel by beam scanning having a small pincushion aberration.

It is still another object of this invention to provide a high-speed energy application apparatus and method for using ultraviolet rays to modify a desired portion of a liquid crystal orientation film in a liquid crystal display in order to obtain desired orientation characteristics.

It is yet another object of this invention to provide a high-speed energy application apparatus and method for drawing an image on an ultraviolet hardening resin and hardening the resin to process it to a desired shape.

It is a more particular object of the present invention to provide an energy application apparatus and method that avoids the use of a complicated lens, such as f$\Theta$ lens, and that has a higher use of light than conventional techniques that use a galvanomirror.

SUMMARY OF THE INVENTION

In accordance with the present invention, there is provided an energy application apparatus to an object located on a plane that includes means for generating an energy beam and for focusing the beam as a spot on the plane; means for reverting the spot of the energy beam in a first direction on the plane; means for moving the object in a second direction on the plane; and means for moving the spot of the energy beam in the second direction by the same amount as with said means for moving the object.

In another embodiment of the present invention, the apparatus for applying energy to an object located on a plane includes: means for generating an energy beam and for focusing the beam as a spot on the plane; means for moving the spot of the energy beam in a first direction on the plane; and means connected to the means for moving the spot of the energy beam in the first direction, for controlling the velocity of the spot of the energy beam.

BRIEF DESCRIPTION OF THE DRAWINGS

The invention is described in detail below with reference to the drawings which illustrate specific embodiments of the invention, in which.

DETAILED DESCRIPTION OF THE INVENTION

Figure 1:
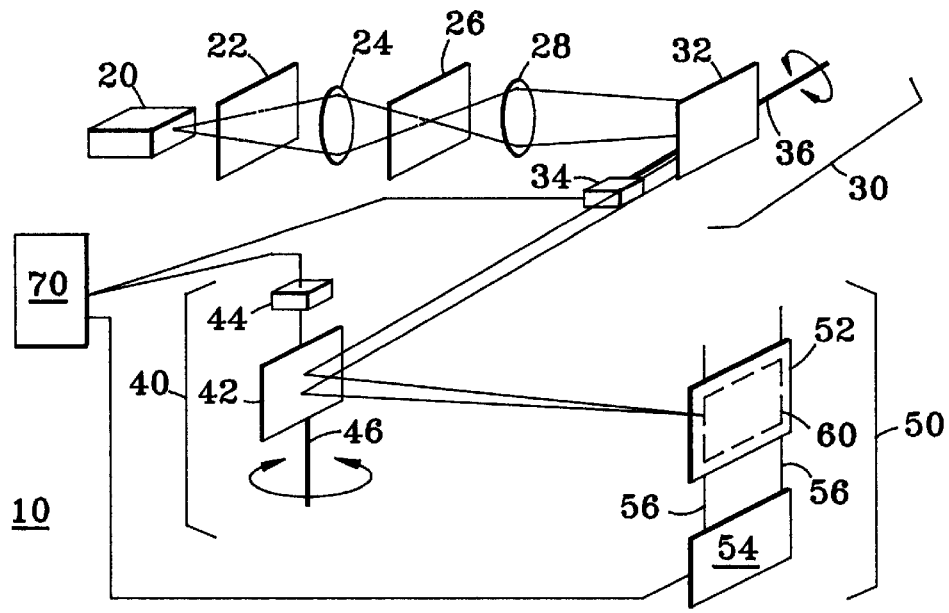
FIG. 1 shows an exposure apparatus according to the present invention.

Referring now to the drawings in more detail, and first to FIG. 1 thereof, there is shown a schematic diagram of a first embodiment of the basic exposure apparatus of the energy application apparatus. The exposure apparatus 10 includes a laser oscillator 20, an optical shutter 22, imaging lenses 24 and 28, a screen 26, a vertical deflecting device 30, a horizontal deflecting device 40, a vertical moving device 50, a liquid crystal panel 60, and a controller 70.

The laser oscillator 20 includes a deep ultraviolet laser oscillator. The optical shutter 22 turns the beam on and off by opening and closing a shutter. The imaging lens 24 is disposed so as to pass the beam from the laser oscillator 20 through a slit (or pattern) of the screen 26, while the imaging lens 28 is disposed so as to focus on the liquid crystal panel 60 the light that passes through the slit (or pattern) of the screen 26. To facilitate processing, the imaging lens 24 preferably includes a spherical lens.

The vertical deflecting device 30 includes a galvanomirror 32 and a mirror driver 34. The galvanomirror 32 is attached to a rotatable horizontal shaft 36. The mirror driver 34 receives vertical control signals from the controller 70 to drive the galvanomirror 32. As in the vertical deflecting device 30, the horizontal deflecting device 40 includes a galvanomirror 42 and a mirror driver 44. The galvanomirror 42 is attached to a rotatable vertical shaft 46. The mirror driver 44 receives horizontal control signals from the controller 70 to drive the galvanomirror 42. The mirror drivers 34 and 44 preferably includes a step motor.

The vertical moving device includes a stage 52 and a stage driver 54. The stage 52 is attached to a rail 56 to allow for vertical movement. The stage driver 54 receives vertical moving control signals from the controller 70 to drive stage 52. The liquid crystal panel 60 is designed to be easily removed from stage 52.

During operation, a light beam emitted from the laser oscillator 20 passes through the optical shutter 22 when in its open position, and is gradually converged and directed by the imaging lens 24 onto the slit (or pattern) on the screen 26. When passing through the slit (or pattern), the light adopts the cross section having a predetermined shape. The light converges into a focus and diffuses a second time. The light then reconverges through the imaging lens 28 and enters the galvanomirror 32. The galvanomirror 32 deflects the beam by a predetermined angle in the vertical direction, and the deflected beam enters the galvanomirror 42. The galvanomirror 42 deflects the beam by a predetermined angle in the horizontal direction. Thereafter, the beam converges into a focus at a desired position of the liquid crystal panel 60 on the stage 52 to expose an image of the slit (or pattern) on the liquid crystal panel.

Figure 2:
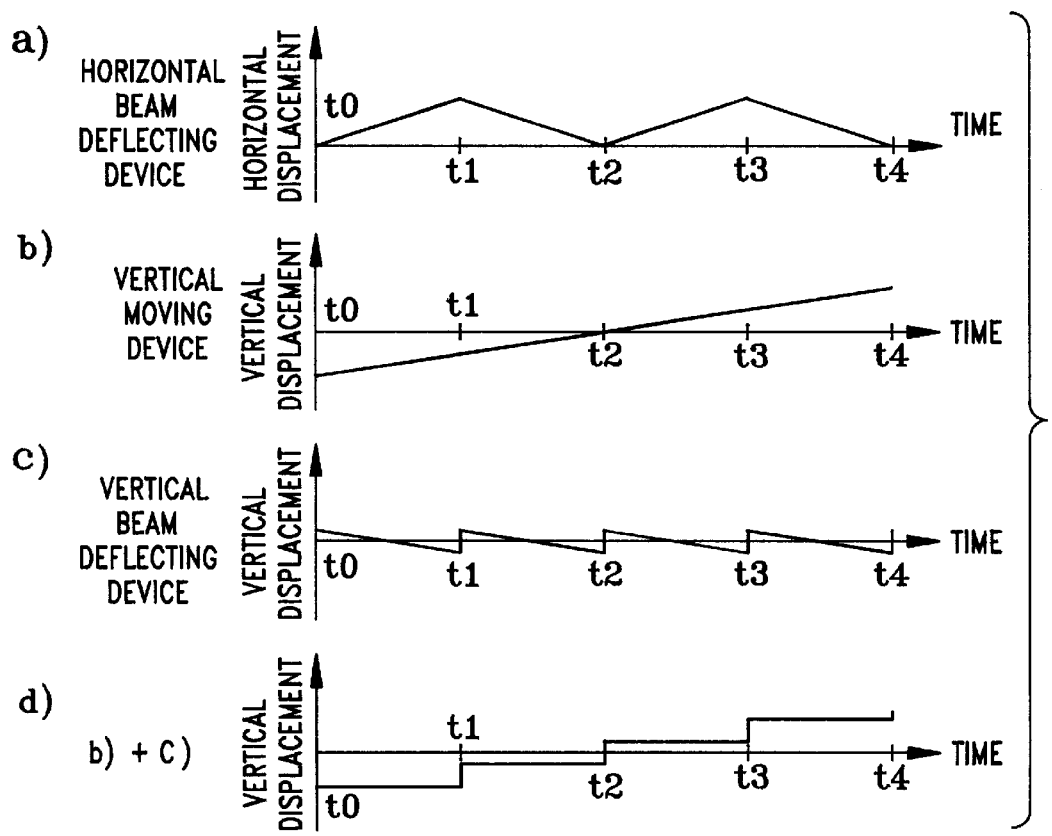
FIG. 2 illustrates plots of the horizontal and vertical beam deflecting device and the vertical moving device, in accordance to the present invention.

FIG. 2 illustrates a scanning method for exposure, according to the present invention. The horizontal beam deflecting device 40 executes horizontal deflection in response to the chopping waves shown in FIG. 2a), which are provided by the controller 70, to the mirror driver 44. The galvanomirror 42 has its deflection angle $\Theta_H$ from the center displaced by the chopping waves shown in FIG. 2a) at a constant angular speed. If the length of an optical path to the liquid crystal panel 60 $r_H$ is sufficiently large and the deflection angle $\Theta_H$ is sufficiently small, it can be assumed that the horizontal displacement on the liquid crystal panel will be $60 \times \approx r_H \times \Theta_H$. Accordingly, the spot moves horizontally at a constant speed. If the above approximation does not hold true, i.e., if errors in velocity of the spot in the periphery of the liquid crystal panel 60 are not negligible, the errors can be corrected by multiplying the deflection angle from the center $\Theta_H$ by a signal $Cos^2\Theta_H$, as it is well known in the art.

Stage 52 is moved by the vertical moving device 50 in response to a waveform having a constant slope, as shown in FIG. 2b), which is provided by the controller 70 to the stage driver 54. Consequently, the spot moves vertically at a constant speed. In the figure, the vertical axis indicates the displacement of the spot relative to the liquid crystal panel 60 on the stage 52, so it should be noted that the stage 52 moves in the direction opposite to that of the spot. The vertical beam deflecting device 30 executes a vertical deflection in response to the saw-tooth waves shown in FIG. 2c) which are provided by the controller 70 to the mirror driver 34. The slope of the saw-tooth wave in FIG. 2c) is as large as the slope in FIG. 2b), but in the opposite direction. The step sections are adjusted so that the track of the spot includes a series of parallel lines separated at a desired interval. FIG. 2d) shows the vertical displacement obtained by synthesizing FIGS. 2b) and 2c). The positive slope in FIG. 2b) is corrected by the negative slope of FIG. 2c). The step sections in FIG. 2c) remain to form a step-like waveform, as shown in FIG. 2d).

Figure 3:
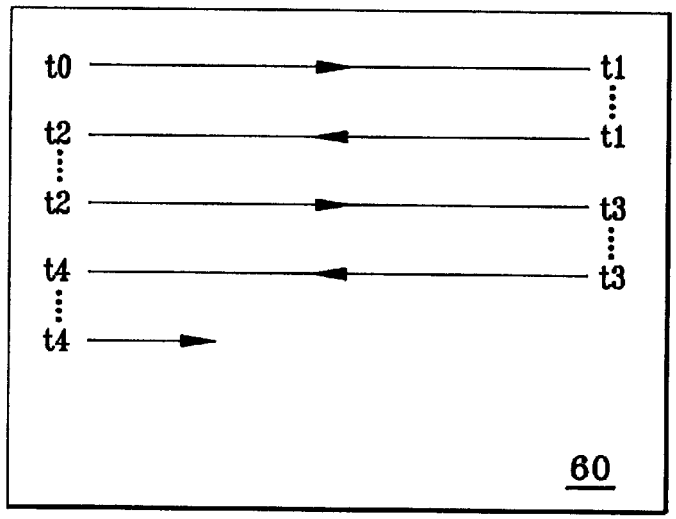
FIG. 3 shows a first track of the spot of a beam in the exposure apparatus according to the invention.

FIG. 3 shows a track at the center of the spot of the liquid crystal cell 60 installed on the stage 52. The track of the spot is described with reference to FIGS. 2 and 3. At time t0, the spot is located at the initial exposure position in the upper left of the liquid crystal panel 60. Between times t0 and t1, the spot moves at a constant speed, horizontally and in a rightward direction (albeit, not vertically). At time t1, the spot instantaneously moves vertically and in a downward direction, while simultaneously starting a horizontal and a leftward movement instead of a movement in the rightward direction. Between times t1 and t2, the spot moves at a constant speed, horizontally and in the leftward direction (albeit, not vertically). At time t2, the spot instantaneously moves vertically in a downward movement, while simultaneously starting a horizontal and a rightward movement, instead of the leftward displacement. The period between t0 and t2 is defined as one cycle. Similar movements are repeated to draw tracks of parallel lines.

The scanning method according to this invention enables to retrace lines for exposure, which would not possible if a horizontal deflection is driven by saw-tooth waves. When compared to the prior art, the present scanning method significantly improves the use of light to increase scanning speed. Furthermore, by moving the object it minimizes the vertical movement of the spot and reduces pincushion aberration (i.e., when the track of the spot does not constitute a straight line in the vertical periphery).

Figure 4:
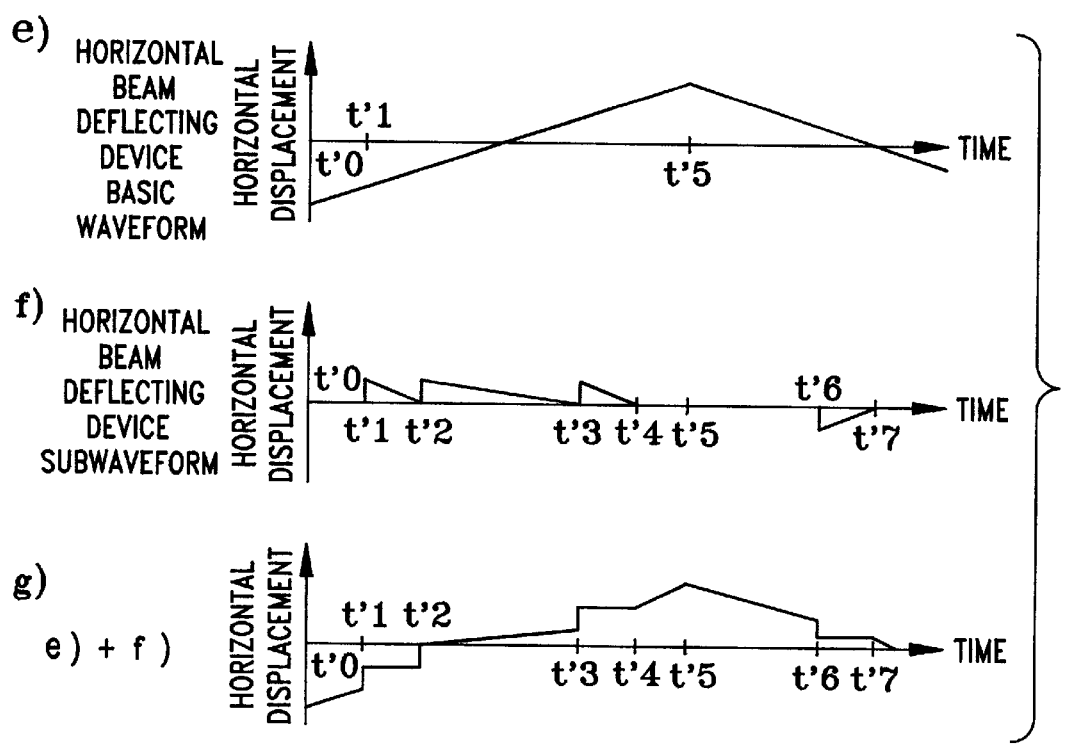
FIG. 4 shows the basic waveform and sub-waveform of the horizontal beam deflecting beam used for controlling the exposure apparatus.
Figure 5:
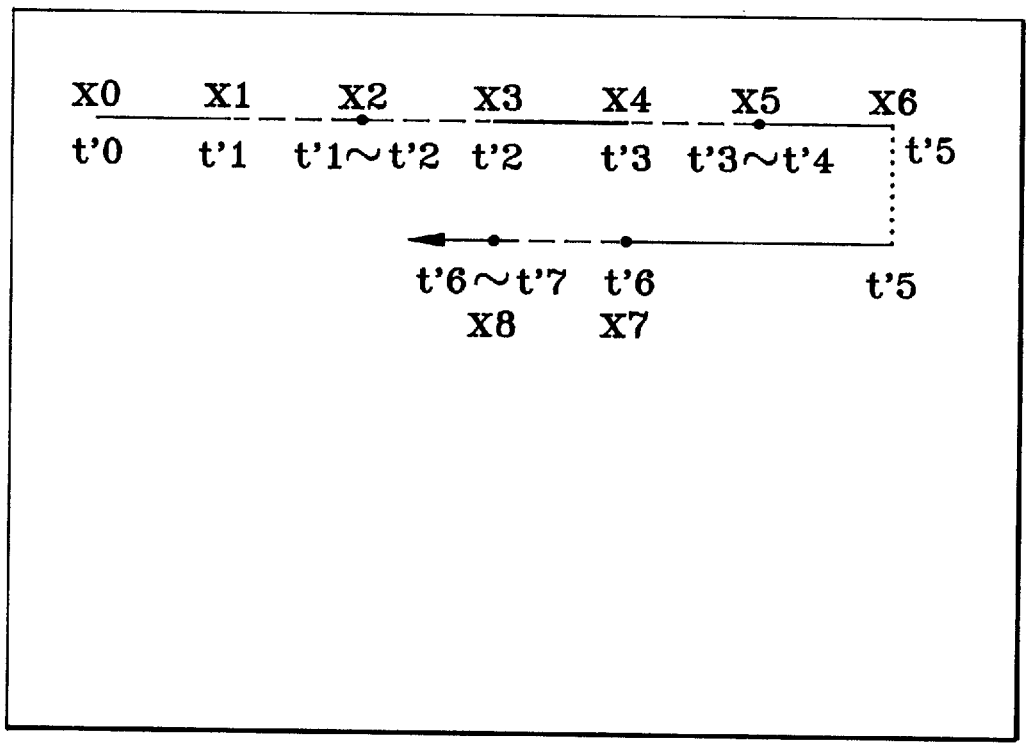
FIG. 5 shows a second track of the spot of a beam in the exposure apparatus.

FIGS. 4 and 5 show a second embodiment of the exposure apparatus, in accordance with the present invention. In a horizontal deflection by the horizontal beam deflecting device 40, the exposure is controlled by the synthesized waveform shown in FIG. 4g), which is synthesized by the controller 70 adding a saw-tooth sub-waveform shown in FIG. 4f) to the basic chopping waveforms shown in FIG. 4e) and provided to the mirror driver 44. Referring to FIGS. 4 and 5, the spot is located at an exposure initial location x0 at the upper left of the liquid crystal panel 60 at time t'0. Between times t'0 and t'1, the sub-waveform shown in FIG. 4f) is 0, and only the basic waveform shown in FIG. 4e) is controlled with the spot moving in the horizontal and the rightward direction, at a constant speed. At time t'1, the spot in x1 instantly moves to x2 in response to an ascending slope in the sub-waveform. Between times t'1 and t'2, the sub-waveform inverts the basic waveform, the spot does not move and remains in x2. At time t'2, the spot again instantaneously moves to x3 in response to a rise in the sub-waveform. Between times t'2 and t'3, the sub-waveform again inverts the basic waveform; however, the synthesized waveform is not zeroed but moves at a lower speed than between t'0 and t'1, thereby increasing the exposure between x3 and x4. At time t'3, the spot in x4 again moves to x5 in response to a rise in the sub-waveform. Between times t'3 and t'4, the sub-waveform again inverts the basic waveform; the spot does not move and remains in x5. Between times t'4 and t'5, the sub-waveform remains at 0, and the spot moves horizontally and rightwardly at constant speed, as in t'0 to t'1. At time t'5, the spot instantaneously moves vertically, and simultaneously starts a horizontal and leftward movement instead of rightward movement, as it was fully described in the first embodiment. Between times t'5 and t'6, the sub-waveform is 0, and the spot moves at constant speed horizontally and in a leftward direction. At time t'6, the spot instantaneously moves from x7 to x8. Between times t'6 and t'7, the spot remains at x8, and later moves horizontally and in a leftward movement at constant speed.

If the ratio of the portion that does not need exposure is large, the use of light can be improved and the exposure time reduced by setting the horizontal scanning velocity. This allows to maximize the ratio of the scanning time for the portion to be exposed and to synchronize the vertical scanning velocity and the stage moving velocity with the horizontal scanning velocity.

The width of the track can be controlled and a pattern can be "projection-exposed" by inserting a slit (or pattern) between the galvanomirror 42 and the liquid crystal panel 60 to form its image on the object. In this case, an image on the object can be prevented from moving during exposure of the pattern by controlling the deflection. This results in a single point such as x2, x5, or x8, as shown in FIG. 5.

The present embodiment is advantageous in that lenses with long focal distance and small aberration can be used to avoid combined lenses, and more particularly, by disposing the vertical and horizontal deflecting devices between the imaging lens 28 and the liquid crystal panel 60.

Experiments were conducted with the first embodiment using a laser oscillator 20, with deep ultraviolet rays having a wavelength of 250 nm, and setting the focal distance of the imaging lens and the entrance pupil diameter at 1,000 mm and 7 to 8 mm, respectively. The resolution of the spot on the object and the focal depth were about 20 $\mu$m and about 10 mm, respectively. Under these conditions, the deflection angle $\Theta_H$ of the horizontal scanning galvanomirror was $-5.7°$ to $+5.7°$. These results indicate that this embodiment can be implemented easily with existing techniques.

Although this invention has been described in conjunction with an exposure apparatus using liquid crystal cells, practitioners of the art fully appreciate that it is not limited to this aspect but it is applicable to, e.g., devices for processing ultraviolet hardening resin. It is also applicable to the control of exposure that uses electronic beams, X rays, particle beams, and the like.

What is claimed is:

1. An apparatus for applying energy to a liquid crystal panel located on a plane, comprising:
    (a) means for generating an energy beam and for focusing said beam as a spot on said plane;
    (b) means for moving the spot of said energy beam in a first direction on said plane within a predetermined range;
    (c) means for moving said liquid crystal panel in a second direction on said plane; and
    (d) means for moving the spot of said energy beam in said second direction by an amount that compensates for the movement of said liquid crystal panel in said second direction on said plane.

2. An energy application apparatus according to claim 1 wherein said energy beam further comprises light beams.

3. An energy application apparatus according to claim 2 wherein said light beams comprises deep ultraviolet laser beams.

4. An energy application apparatus according to claim 3 wherein said means for generating a deep ultraviolet laser beam comprises at least one image forming lens.

5. An energy application apparatus according to claim 1 wherein said means for moving the spot of the energy beam in the first direction on the plane within the predetermined range includes means for reverting the spot in the first direction on the plane within said predetermined range.

6. An energy application apparatus according to claim 5 wherein said means for reverting the spot of the energy beam in the first direction on the plane within the predetermined range further comprises a galvanomirror and means for rotatively reverting the galvanomirror at an equal angular speed within a predetermined range.

7. An energy application apparatus according to claim 1 wherein said means for moving the liquid crystal panel in the second direction on the plane moves said liquid crystal panel in a continuous movement.

8. An energy application apparatus according to claim 1 wherein said means for moving the spot of the energy beam in the second direction further comprises a galvanomirror and means for rotating the galvanomirror at an equal angular speed within a predetermined range.

9. The apparatus according to claim 8, wherein said means for rotating said galvanomirror is driven by a waveform comprising chopping waves and saw-tooth waves.

10. An energy application apparatus according to claim 1 wherein said first direction and said second direction cross each other perpendicularly.

11. An energy application apparatus according to claim 1 wherein said means for moving the spot of said energy beam in the second direction occurs at the same time as when said means for moving the spot in the first direction changes the direction of the spot, and instantaneously moves said spot by a specified amount.

12. An energy application apparatus according to claim 1 wherein said means for moving the spot in the first direction is driven by a waveform comprising chopping waves, and wherein said means for moving the spot of said energy beam in the second direction is driven by a waveform comprising saw-tooth waves.

13. The apparatus according to claim 1, wherein said second direction on said plane differs from said first direction.

14. The apparatus according to claim 1, further comprising means for moving the spot of said energy beam in a direction opposite to said first direction.

15. The apparatus according to claim 14, wherein said direction opposite to said first direction is substantially parallel to a track along which the spot of said energy beam has moved in said first direction.

16. The apparatus according to claim 1, wherein said means for moving the spot of said energy beam in the first direction on the plane comprises a galvanomirror and means for rotating the galvanomirror at an equal angular speed.

17. The apparatus according to claim 1, wherein said means for moving the spot of said energy beam in a direction opposite to the first direction comprises a galvanomirror and means for rotating the galvanomirror at an equal angular speed.

18. The apparatus according to claim 1, wherein said first direction and said second direction cross each other perpendicularly.

19. The apparatus according to claim 1, wherein said means for moving the spot of said energy beam moves the spot of said energy beam in a direction opposite to said first direction and substantially parallel to a track along which the spot of said energy beam has moved in said first direction.

20. A method for applying energy to a liquid crystal panel located on a plane, comprising the steps of:
 (a) generating an energy beam and focusing said beam as a spot on said plane;
 (b) moving the spot of said energy beam in a first direction on said plane within a predetermined range;
 (c) moving said liquid crystal panel in a second direction on said plane; and
 (d) moving the spot of said energy beam in said second direction by an amount that compensates for the movement of said liquid crystal panel in said second direction on said plane.

21. A method for exposing a liquid crystal panel located on a plane, comprising the steps of:
 (a) generating a deep ultraviolet laser beam and focusing said beam as a spot on said plane;
 (b) moving the spot of said deep ultraviolet laser beam in a first direction on said plane within a predetermined range;
 (c) moving said liquid crystal panel in a second direction on said plane; and
 (d) moving the spot of said deep ultraviolet laser beam in said second direction by an amount that compensates for the movement of said liquid crystal panel in said second direction on said plane.

* * * * *